United States Patent
Shusharin et al.

(10) Patent No.: US 9,613,053 B1
(45) Date of Patent: Apr. 4, 2017

(54) TECHNIQUES FOR PROVIDING ACCESS TO A VIRTUALIZED BLOCK STORAGE DEVICE OVER A FILE-BASED NETWORK STORAGE PROTOCOL

(71) Applicant: EMC Corporation, Hopkinton, MA (US)

(72) Inventors: Alexey V. Shusharin, Saint Petersburg (RU); Sergey A. Alexeev, Saint Petersburg (RU); Jean-Pierre Bono, Westborough, MA (US); William Whitney, Marlborough, MA (US); Dmitry N. Tylik, Saint Petersburg (RU); Stanislav Gorshkov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 275 days.

(21) Appl. No.: 14/319,739

(22) Filed: Jun. 30, 2014

(51) Int. Cl.
*G06F 17/30* (2006.01)

(52) U.S. Cl.
CPC .............................. *G06F 17/30233* (2013.01)

(58) Field of Classification Search
CPC ......... G06F 17/30233; G06F 17/30091; G06F 21/6218
USPC ......... 707/722, 705, 770, 822, 827; 709/203
See application file for complete search history.

(56) References Cited

U.S. PATENT DOCUMENTS

| | | | | |
|---|---|---|---|---|
| 7,631,155 B1* | 12/2009 | Bono | ..................... | G06F 3/0608 707/999.202 |
| 7,873,619 B1* | 1/2011 | Faibish | ............. | G06F 17/30091 707/705 |
| 8,037,345 B1* | 10/2011 | Iyer | ..................... | G06F 11/1004 714/20 |
| 8,407,265 B1* | 3/2013 | Scheer | ............. | G06F 17/30138 707/823 |
| 2008/0005468 A1* | 1/2008 | Faibish | ................. | G06F 3/0622 711/114 |
| 2013/0238562 A1* | 9/2013 | Kumarasamy | .... | G06F 17/30088 707/649 |
| 2013/0282994 A1* | 10/2013 | Wires | ..................... | G06F 3/0604 711/158 |
| 2014/0006731 A1* | 1/2014 | Uluski | .................. | G06F 3/0604 711/155 |
| 2015/0220354 A1* | 8/2015 | Nair | ........................ | G06F 12/10 710/301 |
| 2015/0227602 A1* | 8/2015 | Ramu | ............... | G06F 17/30575 707/634 |

* cited by examiner

*Primary Examiner* — Evan Aspinwall
(74) *Attorney, Agent, or Firm* — BainwoodHuang (57) ABSTRACT

Techniques are described for allowing a data storage system to provision all vVols (or other similar virtual storage containers) as logical storage devices, which can be bound to either a block-based protocol endpoint as an exposed LUN or to a file-based protocol endpoint as a file. This may be accomplished by operating, as part of the file-based protocol endpoint, a lightweight filesystem that creates file abstractions that map to underlying logical storage devices.

20 Claims, 4 Drawing Sheets

TECHNIQUES FOR PROVIDING ACCESS TO A VIRTUALIZED BLOCK STORAGE DEVICE OVER A FILE-BASED NETWORK STORAGE PROTOCOL

BACKGROUND

Often computer systems are configured to perform many separate and independent tasks. In order to efficiently and cleanly allocate resources to the various tasks, many enterprises run a plurality of separate virtual machines (VMs) in parallel on a single server computer in a virtualized and distributed environment. Example systems for executing multiple VMs on servers include the ESX, ESXi, and vSphere products distributed by VMware, Inc. of Palo Alto, Calif.

Many virtualization servers provide hard drive storage for their VMs on the same machines that run the respective VMs. However, in some situations, it may be desirable to offload the storage onto an external data storage system.

SUMMARY

Offloading the storage onto an external data storage system may be accomplished through the use of a vVol virtual storage container (or another kind of virtual storage container) hosted on a remote data storage system, accessible through a protocol endpoint running on the data storage system. For example, for a block-based data storage system, the protocol endpoint may expose a logical unit of storage (LUN) of the data storage system as the vVol over a block-based network protocol. As another example, in the case of a file-based data storage system, the protocol endpoint may expose a file of a filesystem on the data storage system as a vVol over a file-based network protocol.

Unfortunately, the above-described techniques may suffer from deficiencies in broadly supporting a variety of computing environments. For example, it would be useful to allow a single vVol to be accessible by VMs interchangeably using either file- or block-based protocols, but this is currently not possible, as extensive migration operations must generally be performed to transform a file accessible over a file-based network protocol into a LUN and vice-versa. In addition, it would be desirable to be able to perform block-level services, such as replication, snapshotting, cloning, and de-duplication across vVols regardless of whether they are accessed via the file- or block-based protocols.

In order to alleviate these deficiencies, it would be desirable for a data storage system to provision all vVols (or other virtual storage containers) as block-based logical storage devices, which can be bound to either a block-based protocol endpoint as an exposed LUN or to a file-based protocol endpoint as a file. This may be accomplished by operating, as part of the file-based protocol endpoint, a lightweight filesystem that creates file abstractions that map to underlying logical storage devices. Thus, the same vVol may be accessible in either a block-based or a file-based environment.

One embodiment of the improved techniques is directed to a method of providing access to a VM-accessible storage container (VMASC) on a data storage system over a file-based network storage protocol. The method includes exporting a mount point for a lightweight filesystem accessible by the file-based network storage protocol to a VM storage manager executing on a remote computing system. The VM storage manager operates in conjunction with at least one VM instance. The lightweight filesystem provides a limited set of file-based operation features, the limited set of file-based operation features being smaller than a set of file-based operation features provided by the file-based network storage protocol.

The method also includes placing a link to the VMASC as a file entry within the lightweight file system. The VMASC resides on a block-based storage device of the data storage system. The file entry represents the VMASC as a file. The data storage system receives, from the VMSM operating on the remote computing system, via the file-based network storage protocol, a file-based command directed at the file represented by the file entry within the lightweight filesystem. The file-based command includes a command to access a particular address within the file. In response to receiving the file-based command, a particular block is accessed within the VMASC mapped to by the particular address within the file. Other embodiments are directed to a system, a computerized apparatus, and a computer program product for performing methods similar to that described above.

These embodiments are advantageous because they allow a data storage system to provision all vVols as VMASCs, which can be bound to either a block-based protocol endpoint as an exposed LUN or to a file-based protocol endpoint as a file. This provides flexibility, such as allowing easy migration of VMs and their respective storage from one type of computing environment to another.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to improved techniques for allowing a data storage system to provision all vVols (or other virtual storage containers) as logical storage devices, which can be bound to either a block-based protocol endpoint as an exposed LUN or to a file-based protocol endpoint as a file. This may be accomplished by operating, as part of the file-based protocol endpoint, a lightweight filesystem that creates file abstractions that map to underlying logical storage devices.

Figure 1:
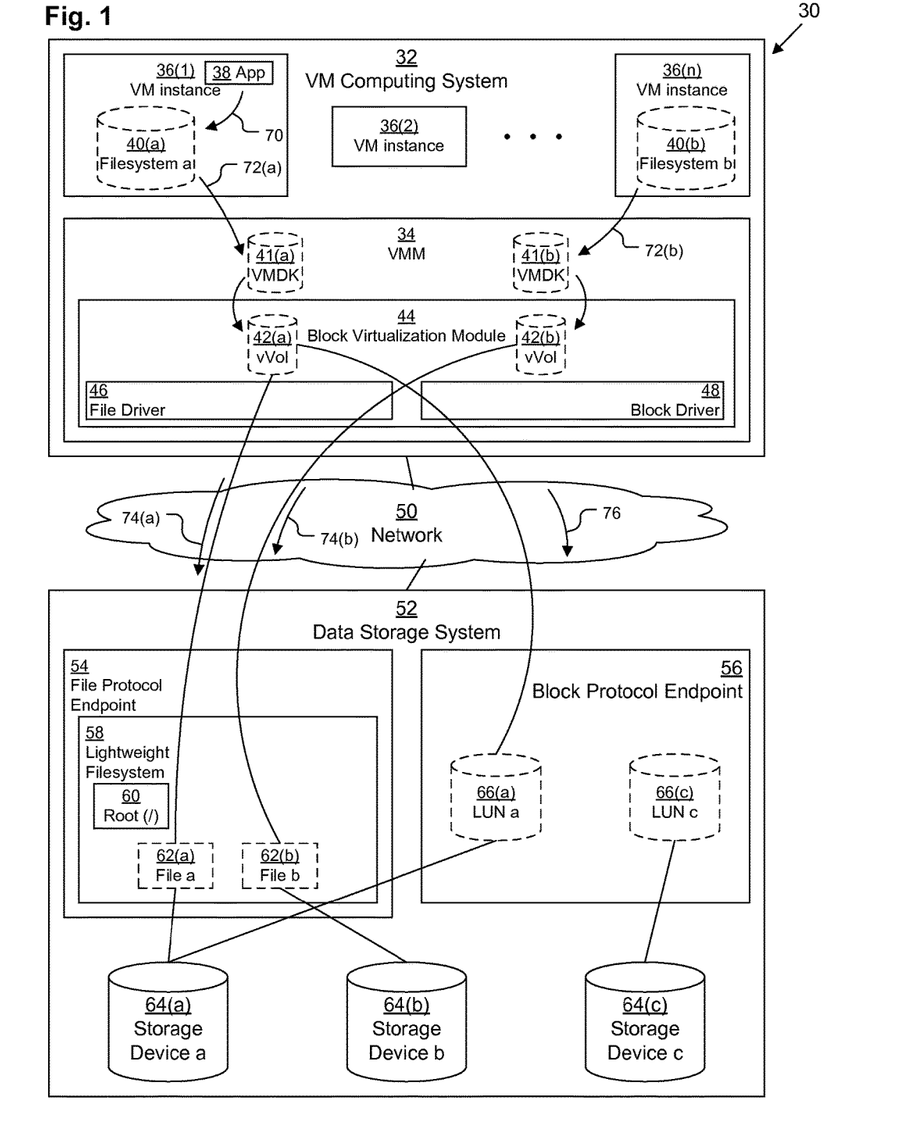
FIG. 1 depicts an example environment according to various embodiments.

FIG. 1 depicts an example virtualized environment 30. Environment 30 includes a virtual machine (VM) computing system 32 connected via a network 50 to a data storage system 52.

VM computing system 32 may include one or more computer servers connected by network (either by network 50 or by one or more separate networks). In some embodiments, several computer servers are configured to each run a plurality of VM compute modules, while additional virtualization modules (e.g., block virtualization module 44, networking modules, etc.) may each run on a separate server. In some embodiments, at least two of the various additional virtualization modules run on the same server. In some embodiments, at least one of the various additional virtualization modules runs on the same server as at least some of the compute modules. However, for the purposes of this disclosure, the entire VM computing system 32 will be discussed as a single cohesive unit, unless otherwise specified.

VM computing system 32 runs a VM management application (VMM) 34 (which may be spread across various servers of the VM computing system 32). VMM 34 operates one or more VM instances 36 (depicted as VM instances 36(1), 36(2), ..., 36(n)), each having its own protected memory space (not depicted) and executing within its own dedicated compute module. Each VM instance 36 typically has at least one filesystem 40, managed by the respective VM instance, for file-based storage purposes. Thus, as depicted, VM instance 36(1) runs an application 38, which is configured to send file-based commands 70 (i.e., using file-based library calls) to the operating system (not depicted) of the VM instance 36(1) to access particular files within filesystem 40(a). The VM instance 36(1) manages its own filesystem 40(a) and therefore sends block-based commands 72(a) (e.g., using block-based library calls) to a virtual disk abstraction (VMDK) 41(a) provided by the VMM 34. In turn, the block virtualization module 44 realizes the VMDK 41(a) as a vVol abstraction 42(a) (or another kind of virtual storage container abstraction). Block virtualization module 44 may provide access to the vVol abstraction 42(a) in two ways; either through file driver 46 or through block driver 48, although, in a typical implementation, usually only one of these drivers is used per machine.

File driver 46 communicates over network 50 by sending file-based commands 74(a) (i.e., using a file-based network storage protocol, such as, for example, the Network File System (NFS) or the Common Internet File System (CIFS)) to the data storage system 52. Network 50 is typically a local area network (LAN), a wide area network (WAN), a virtual private network (VPN), a point-to-point connection, or a fabric of interconnected hubs, switches, and/or cables configured to send packet-based signals, typically over Ethernet connections. Data storage system 52 may be any kind of data storage system (e.g., a data storage array) capable of providing both file-based and block-based access. Each data storage array may be, for example, a VNX®, VNXe®, or CLARiiON® CX4 data storage array provided by the EMC Corporation of Hopkinton, Mass.

Since file driver 46 sends file-based commands 74(a) using a file-based network storage protocol, data storage system 52 routes the commands 74(a) to a file protocol endpoint 54 running on the data storage system 52. File protocol endpoint 54 provides a lightweight filesystem 58 which includes a root directory 60. Logically placed within the root directory 60 are file abstractions 62 (shown with a dotted border to indicates that these are mere abstractions) that represent vVols 42 which have been bound to the file protocol endpoint 54, each file abstraction 62 being linked to a respective underlying storage device 64. Thus, as depicted, file abstraction 62(a) is bound to vVol 42(a), file abstraction 62(a) linking to underlying storage device a 64(a); and file abstraction 62(b) is bound to vVol 42(b), file abstraction 62(b) linking to underlying storage device a 64(b). The file-based commands 74(a) are directed at file abstraction 62(a), mapping to storage commands to be executed on storage device a 64(a).

Similarly, VM instance 36(n) manages its own filesystem 40(b) and therefore sends block-based commands 72(b) (i.e., using a block-based protocol) to a vVol abstraction 42(b) provided by the block virtualization module 44. File driver 46 communicates over network 50 by sending file-based commands 74(b) (i.e., using a file-based network storage protocol) to the data storage system 52. Since file driver 46 sends file-based commands 74(b) using a file-based network storage protocol, data storage system 52 routes the commands 74(b) to file protocol endpoint 54 running on the data storage system 52, which routes the commands 74(b) to file abstraction 62(b), mapping to storage commands to be executed on storage device b 64(b).

In the event that block virtualization module 44 provides access to the vVol abstraction 42(a) through block driver 48, block driver 48 communicates over network 50 by sending block-based commands 76 (i.e., using a block-based network storage protocol, such as, for example, Small Computer System Interface (SCSI) commands) to the data storage system 52. Although the network 50 used for this purpose may be the same network 50 as used for the file-based commands (in which case, the iSCSI protocol would likely be used), in some embodiments, a separate storage area network (SAN) using a switched Fibre Channel fabric may be used for sending the block-based commands 76.

Since block driver 48 sends block-based commands 76 using a block-based network storage protocol, data storage system 52 routes the commands 76 to a block protocol endpoint 56 running on the data storage system 52. Block protocol endpoint 56 provides logical storage unit (LUN) abstractions 66 that represent vVols 42 which have been bound to the block protocol endpoint 56, each LUN abstraction 66 being linked to a respective underlying storage device 64. Thus, as depicted, LUN abstraction 66(a) is bound to vVol 42(a), LUN abstraction 66(a) exposing a pass-through connection to underlying storage device a 64(a); and LUN abstraction 66(c) is bound to another vVol 42(c) (not depicted), LUN abstraction 66(c) exposing a pass-through connection to underlying storage device c 64(c). The block-based commands 76 are directed at LUN abstraction 66(a), which are forwarded down the driver stack to be directly executed on storage device a 64(a).

Figure 2:
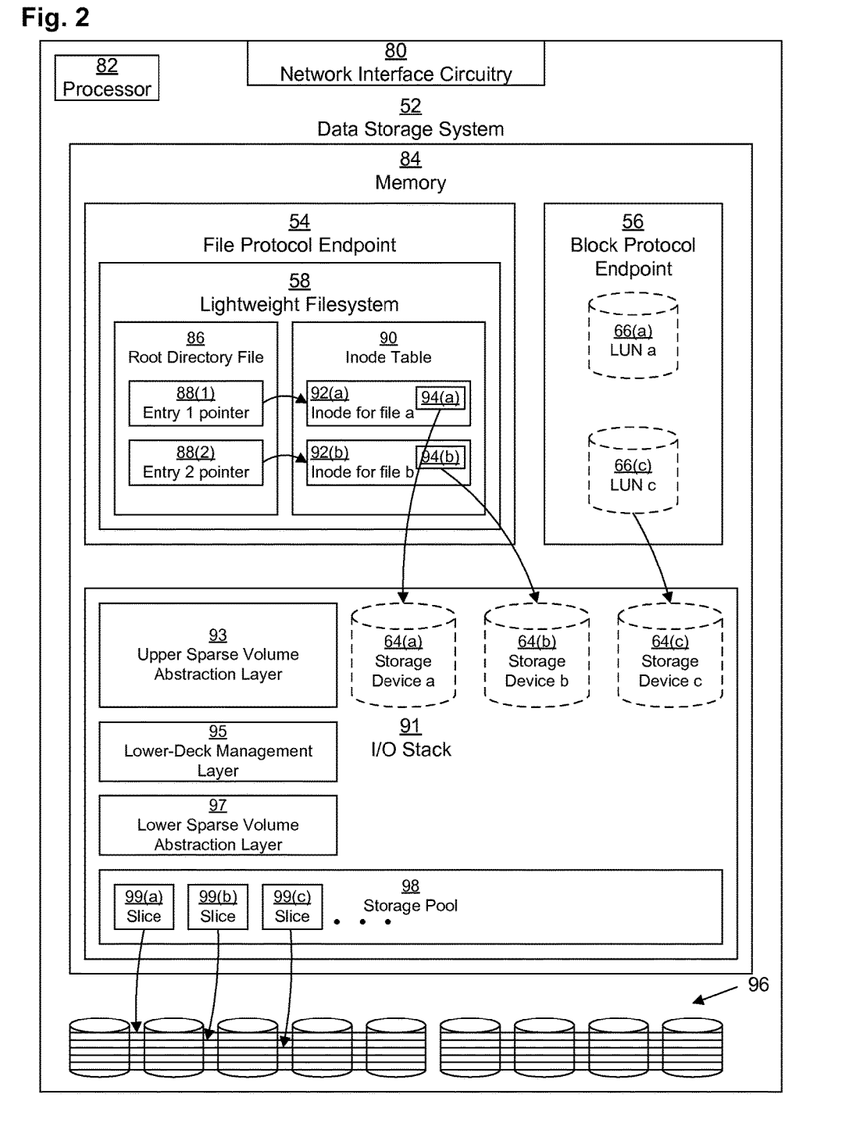
FIG. 2 depicts an example apparatus according to various embodiments.

FIG. 2 depicts an example data storage system 52 in further detail. Data storage system 52 may be any kind of computing device that provides storage, such as, for example, a personal computer, a workstation computer, a server computer, an enterprise server computer, a laptop computer, a tablet computer, a smart phone, etc. Typically, however, data storage system 52 will be a data storage array, such as one of the aforementioned VNX®, VNXe®, or CLARiiON® CX4 data storage arrays.

Data storage system 52 includes network interface circuitry 80, a processor 82, memory 84, and a set of persistent storage devices 96. Network interface circuitry 80 may include one or more Ethernet cards, cellular modems, Wireless Fidelity (WiFi) wireless networking adapters, any other devices for connecting to a network 50 or some combination thereof.

Processor 82 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 82 may also include processing circuitry configured to control and connect to the set of persistent storage devices 96.

Memory 84 may be any kind of digital system memory, such as, for example, random access memory (RAM). Memory 84 stores an operating system (OS) (not depicted, e.g., Linux, UNIX, Windows, or a similar operating system) and one or more applications executing on processor 82 as well as data used by those programs.

It should be understood that network interface circuitry 80, processor 82, and memory 84 interconnect, and they all may reside on a storage processor board of the data storage system 52. There may be multiple independent storage processor boards per data storage system, arranged in a highly-available fault-tolerant manner.

Memory 84 stores file protocol endpoint 54 and block protocol endpoint 56 as these endpoints execute on processor 82. Typically, code for the OS, file protocol endpoint 54, and block protocol endpoint 56 are also stored within some form of persistent storage, either on a dedicated persistent boot drive or within the set of persistent storage devices 96, so that these components can be loaded into system memory 84 upon startup. A protocol endpoint (e.g., 54, 56), when stored in non-transient form either in system memory 84 or in persistent storage, forms a computer program product. The processor 82 running one or more of these endpoints 54, 56 thus forms a specialized circuit constructed and arranged to carry out various processes described herein.

In some embodiments, memory 84 also stores lightweight filesystem 58 in connection with file protocol endpoint 54. In other embodiments, however, lightweight filesystem 58 may be stored within persistent storage 96 rather than within system memory 84. However, even if the contents of lightweight filesystem 58 are stored in persistent storage 96, in some embodiments, the contents of lightweight filesystem 58 may not persist across restarts of the data storage system 52. Thus, in those embodiments, upon restarting, the root directory 60 of the lightweight filesystem 58 may be empty, no vVols 42 being bound to the file protocol endpoint 54 except by explicit binding after starting up. In general, although, in some embodiments, the lightweight filesystem 58 may persist, persistence is not essential to the lightweight filesystem 58 in the way that persistence is typically important to a regular filesystem to avoid data loss.

Root directory 60 has a flat structure. The contents of root directory 60 are defined by directory entries 88 within a root directory file 86, which is metadata of the lightweight filesystem 58. Each directory entry 88 is a pointer to a particular inode 92 within inode table 90 of the lightweight filesystem 58, each inode 92 (which is metadata of the lightweight filesystem 58) representing a respective file abstraction 62. Each directory entry 88, in addition to pointing to the respective inode 92 for the respective file abstraction 62, also includes a file name identifying the particular vVol 42 which is bound thereto.

Each inode 92 includes a respective pointer 94 to a respective storage device 64 that provides the underlying storage. The lightweight filesystem 58 being lightweight, typically the inode 92 will include only a single pointer 94 to its respective storage device 64 rather than contain a set of direct and indirect pointers to individual constituent blocks of a file as would be the case in a traditional filesystem.

In some embodiments (not depicted), the storage devices 64 may themselves be physical disk drives of the set of persistent storage devices 96 or partitions thereon. In other embodiments, each storage device 64 is an abstraction which maps to actual storage provided by a respective subset of the set of persistent storage devices 96. For example, the storage for a storage device 64 may be provided by one or more slices across one or more Redundant Array of Independent Disk (RAID) groups.

In some embodiments (as depicted), each storage device 64 may be a partition abstraction provided by a software layer within a I/O driver stack 91. I/O stack 91 includes a storage pool 98, which abstracts a set of set of storage slices 99. Each slice 99 is actually provided from with a RAID group of the set of persistent storage devices 96. I/O stack 91 also includes a lower sparse volume abstraction layer 97, which provides an abstraction of a volume (not depicted) using a collection of slices 99 from the storage pool 98. A lower-deck management layer 95 provides a lower-deck filesystem (not depicted) which sits atop the abstracted volume. Within this lower-deck filesystem is a container file (not depicted). The upper sparse volume abstraction layer 93 provides the partition abstraction of a storage device 64 from the container file. Typically, each storage device has its own container file within its own lower-deck filesystem.

As depicted, file abstraction a 64(*a*) (which represents vVol 42(*a*)) is represented by root directory file entry pointer 88(1) pointing to inode 92(*a*), which contains a pointer 94(*a*) to storage device a 64(*a*).

Lightweight filesystem 58 is considered "lightweight" for several reasons. One, as mentioned above, it contains file abstractions 62 rather than actual files with actual block pointers. Two, it has a flat directory structure, with no directories under the root directory 60. Three, it provides a limited set of filesystem features to the remote file driver 46 over the file-based network storage protocol in comparison to a full-featured filesystem. Thus, certain filesystem operations are not provided over the file-based network storage protocol, while other features are provided. Filesystem features that passively obtain information (e.g., the GETATTR, ACCESS, and READ operations of NFS) as well as filesystem features for writing data to a file (e.g., the WRITE and COMMIT operations of NFS) are provided. However, filesystem features for modifying the directory structure and other metadata of the filesystem (e.g., the SETATTR, READLINK, REMOVE, RENAME, LINK, CREATE, MKDIR, etc. operations of NFS) are not provided over the file-based network storage protocol. Certain features for modifying the directory structure, such as adding and removing file abstractions 62 (and associating the respective directory entries 88 with inodes 92 and pointers 94) are provided outside the context of the file-based network storage protocol. Thus, the file abstractions 62 may be set up and removed through the use of an out-of-band management protocol, such as the vSphere Storage APIs (VASA), promulgated by VMware, over the Simple Object Access Protocol (SOAP).

Figure 3:
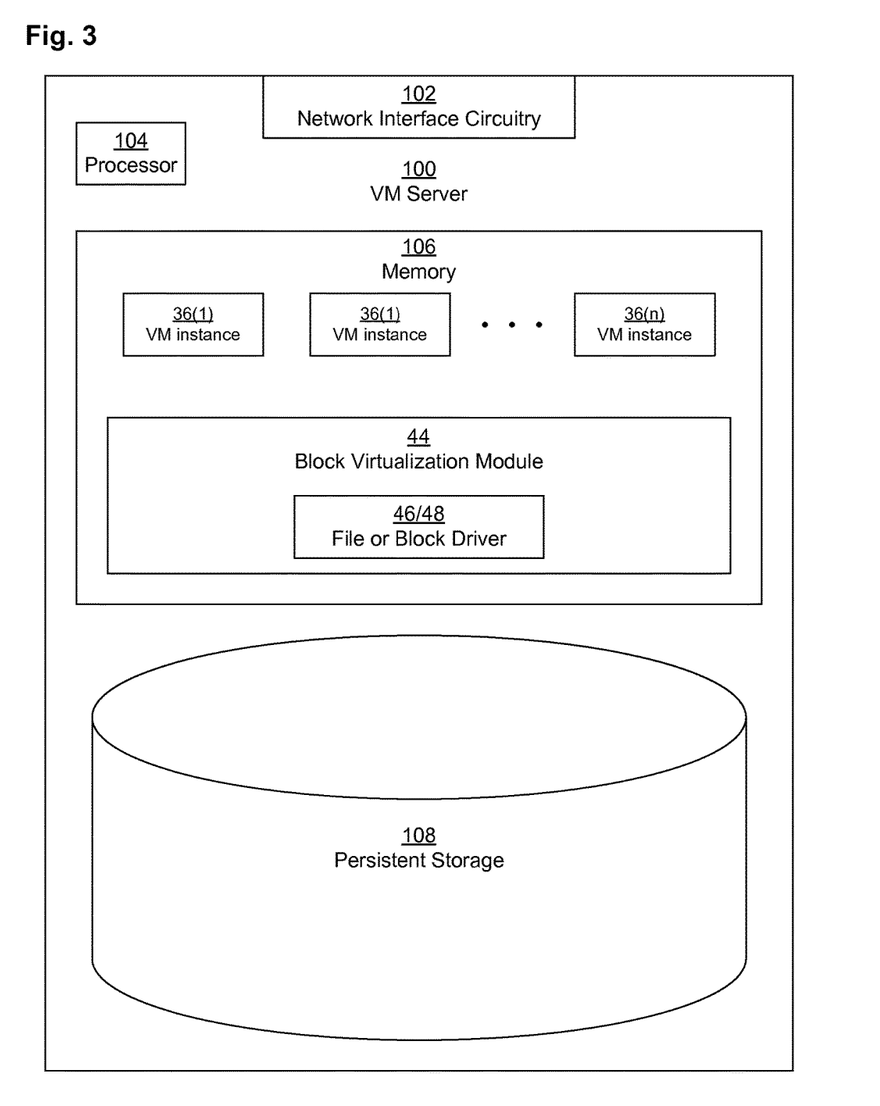
FIG. 3 depicts another example apparatus according to various embodiments.

FIG. 3 depicts an example VM server 100, making up at least a portion of the VM computing system 32, in further detail. VM server 100 at least runs the block virtualization module 44, while other modules of the VM computing system 32 may run either on the VM server 100 or on other (similar) server computers. Typically, VM server 100 will be an ESX or ESXi server distributed by VMware VM server 100 may be any kind of computing device, such as, for example, a personal computer, a workstation computer, a server computer, an enterprise server computer, a laptop computer, a tablet computer, a smart phone, etc. Typically, however, VM server 100 will be server computer or an enterprise server computer.

VM server 100 includes network interface circuitry 102, a processor 104, memory 106, and persistent storage 108. Network interface circuitry 102 may include one or more Ethernet cards, cellular modems, WiFi wireless networking adapters, any other devices for connecting to a network 50 or some combination thereof.

Processor 104 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processor 104 may also include processing circuitry configured to control and connect to the persistent storage 108.

Memory 106 may be any kind of digital system memory, such as, for example, RAM. Memory 106 stores an OS (not depicted, e.g., Linux, UNIX, Windows, a bare metal hypervisor, or a similar operating system) and one or more applications executing on processor 104 as well as data used by those programs. Memory 106 stores block virtualization module 44 (and its file driver 46 and/or block driver 48) as these components execute on processor 104. Typically, code for the OS, block virtualization module 44, file driver 46, and block driver 48 are also stored within persistent storage 108, so that these components can be loaded into system memory 106 upon startup. An application module (e.g., block virtualization module 44), when stored in non-transient form either in system memory 106 or in persistent storage 108, forms a computer program product. The processor 104 running block virtualization module 44 thus forms a specialized circuit constructed and arranged to carry out various processes described herein.

During execution, block virtualization module 44 interfaces with the various VM instances 36 executing within the VM computing system 32 to provide the vVol abstractions 42 to the respective VM instances 36, using some combination of file-based paths and block-based paths in an optimized manner. Thus, for example, in some embodiments, depending whether a LAN/WAN or SAN connects the VM server 100 to the data storage system 52, the block virtualization module 44 selects either the file driver 46 or the block driver 48, respectively. If both LAN/WAN and SAN connections are available, block virtualization module 44 may load-balance between them using both the file driver 46 or the block driver 48 for respective vVols abstractions 42.

However, in other embodiments, VM computing system 32 will only operate in conjunction with one or the other of file-based or block-based protocols, and thus, only one of the file driver 46 or the block driver 48 will be present.

Figure 4:
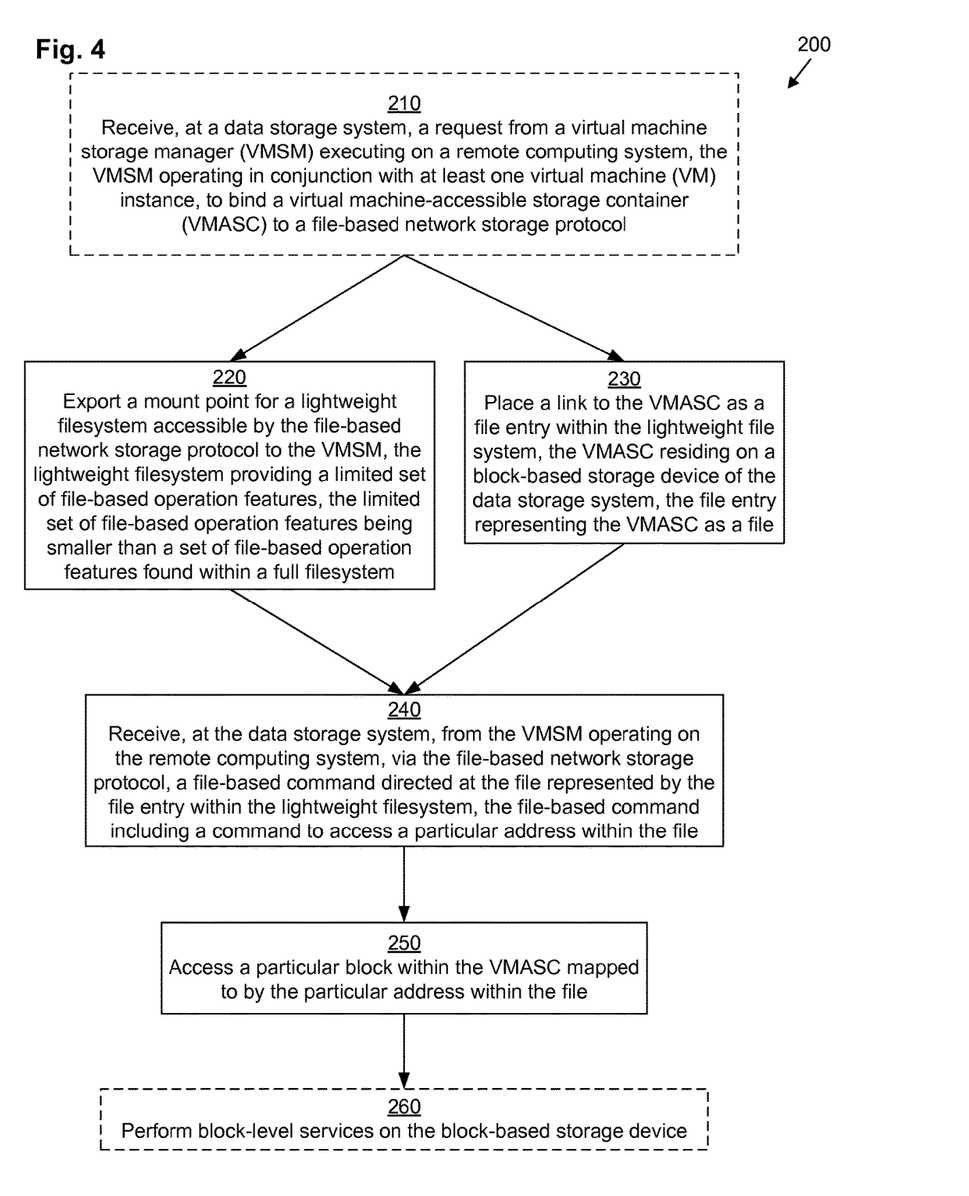
FIG. 4 depicts an example method according to various embodiments.

FIG. 4 depicts an example method 200 according to various embodiments for providing access to a virtual machine-accessible storage container (VMASC) (i.e., a storage device 64) on a data storage system 52 over a file-based network storage protocol. It should be understood that any time a piece of software, such as, for example, block virtualization module 44, file protocol endpoint 54, or block protocol endpoint 56, is described as performing a method, process, step, or function, in actuality what is meant is that a computing device (e.g., VM server 100, data storage system 52) on which that piece of software 44, 54, 56 is running performs the method, process, step, or function when executing that piece of software on its processor 82, 104.

It should be understood that, within FIG. 4, steps 210 and 260 are dashed because they are ancillary and/or optional.

In preliminary step 210 of method 200, file protocol endpoint 54 receives a request (e.g., using VASA over SOAP) from a virtual machine storage manager (VMSM) (e.g., block virtualization module 44) executing on a remote computing system (e.g., VM computing system 32, and more specifically, on VM server 100), the VMSM operating in conjunction with at least one virtual machine (VM) instance 36 (e.g., VM instance 36(1)), to bind a VMASC (e.g., storage device 64(*a*)) to a file-based network storage protocol (e.g., NFS) so that the VMSM can provide the VM instance 36 (e.g., VM instance 36(1)) access to that VMASC as a vVol 42 (e.g., vVol 42(*a*)).

In response file protocol endpoint 54 performs steps 220 and 230. In step 220, file protocol endpoint 54 exports (e.g., using VASA over SOAP) a mount point for a lightweight filesystem 58 accessible by the file-based network storage protocol to the VMSM (e.g., to the file driver 46 of block virtualization module 44), the lightweight filesystem 58 providing a limited set of file-based operation features, the limited set of file-based operation features being smaller than a set of file-based operation features found within a full filesystem. The mount point will typically be the root directory 60. This allows the file driver 46 to mount the lightweight filesystem 58 in order to have access to any VMASC which has been exposed to the lightweight filesystem 58.

In some embodiments, step 220 need not be performed in response to every request to bind a VMASC to a file-based network storage protocol, if, for example, the file driver 46 already has the mount point of the root directory 60 from another currently-bound vVol 42 (e.g., vVol 42(*b*) bound in conjunction with VM instance 36(*n*)).

In step 230, file protocol endpoint 54 places a link to the VMASC as a file entry within the lightweight file system 58, the VMASC residing on a block-based storage device of the data storage system, the file entry representing the VMASC as a file (e.g., file abstraction 62(*a*)). In particular, file protocol endpoint 54 creates an inode 92(*a*) for the file abstraction 62(*a*), placing a link 94(*a*) to the storage device 64(*a*) (which is the VMASC) within that inode 92(*a*). File protocol endpoint also places a directory entry for the file abstraction 62(*a*) within root directory file 86 containing a pointer to the inode 92(*a*) and a filename associated with the vVol 42(*a*), thereby creating a file abstraction 62(*a*) accessible within the lightweight filesystem for the vVol 42(*a*).

After steps 220 and 230 have completed, file driver 46 is able to see all the file abstractions 62 within the filesystem 58, thereby allowing it to have access to file abstraction 62(*a*), which represents vVol 42(*a*).

Then, in step 240, file protocol endpoint 54 receives from the VMSM operating on VM server 100, via the file-based network storage protocol, a file-based command (e.g., 74(*a*)) directed at the file (e.g., file abstraction 62(*a*)) represented by the file entry within the lightweight filesystem 58, the file-based command including a command to access a particular address within the file. This file-based command 74(*a*) points to an address within the file abstraction 62(*a*) that maps to a certain block within the vVol 42(*a*).

In response, in step 250, file protocol endpoint 54 accesses a particular block within the VMASC (e.g., the storage device 64(*a*)) mapped to by the particular address within the file. This allows the VM instance 36(1) to access a certain block within vVol 42(*a*) by requesting a corresponding address within file abstraction 62(*a*) that is backed up by a corresponding block on the storage device 64(*a*).

In optional step 260, the data storage system 52 is able to perform block-level services, including any of replication, cloning, de-duplication, and snapshotting, on the set of persistent storage devices 96. This allows these services to be performed on all vVols 42 together, without processing file-based and block-based vVols separately.

In addition, at a later time, block virtualization module may provide access to the same vVol 42(*a*) via a block-based network storage protocol (e.g., if the file protocol endpoint 54 goes offline or if a load-balancing feature indicates that performance could be increased by switching protocols) by switching to using block driver 48 and then directly accessing storage device 64(*a*) exposed as a LUN 66(*a*) by block protocol endpoint 56.

Thus, techniques have been described for allowing a data storage system 52 to provision all vVols 42 as logical storage devices 64, which can be bound to either a block-based protocol endpoint 56 as an exposed LUN 66 or to a file-based protocol endpoint 54 as a file. This may be accomplished by operating, as part of the file-based protocol endpoint 54, a lightweight filesystem 58 that creates file abstractions 62 that map to underlying logical storage devices 64.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of providing access to a virtual machine-accessible storage container (VMASC) on a data storage system over a file-based network storage protocol, the method comprising:

exporting, by the data storage system, a mount point for a lightweight filesystem accessible using the file-based network storage protocol to a virtual machine storage manager (VMSM) executing on a remote computing system, the VMSM operating in conjunction with at least one virtual machine (VM) instance, the lightweight filesystem providing a limited set of file-based operation features, the limited set of file-based operation features being smaller than a set of file-based operation features provided by the file-based network storage protocol;

placing a link to the VMASC as a file entry within the lightweight file system, the VMASC residing on a block-based storage device of the data storage system, the file entry representing the VMASC as a file;

receiving, at the data storage system, from the VMSM operating on the remote computing system, via the file-based network storage protocol, a file-based command directed at the file represented by the file entry within the lightweight filesystem, the file-based command including a command to access a particular address within the file; and in response to receiving the file-based command, accessing a particular block within the VMASC mapped to by the particular address within the file.

2. The method of claim 1 wherein the limited set of file-based operation features includes features for read-only access to filesystem metadata and full read/write access to file contents, the limited set of file-based operation features excluding write access to filesystem metadata.

3. The method of claim 2 wherein the lightweight filesystem is stored entirely with volatile system memory of the data storage system.

4. The method of claim 1 wherein exporting the mount point and placing the link to the VMASC as the file entry within the lightweight file system are performed in response to receiving, at the data storage system, a request from the VMSM executing on the remote computing system to bind the VMASC to the file-based network storage protocol.

5. The method of claim 1 wherein the method further comprises:

exposing the VMASC to a block-based network storage protocol as a logical unit of storage of the data storage system;

receiving, at the data storage system, from the VMSM operating on the remote computing system, via the block-based network storage protocol, a block-based command directed at the logical unit of storage; and in response to receiving the block-based command, accessing the VMASC.

6. The method of claim 5 wherein the block-based network storage protocol is Small Computer System Interface (SCSI) over Fibre Channel.

7. The method of claim 1 wherein the method further comprises performing block-level storage services on the block-based storage device, wherein the block-level storage services include replication.

8. The method of claim 1 wherein placing the link to the VMASC as the file entry within the lightweight file system includes:

creating, as part of the metadata of the lightweight filesystem, an inode for the file, the inode including a pointer to the VMASC; and placing a directory entry within a root directory file, the directory entry pointing to the inode, the root directory file being metadata of the lightweight filesystem.

9. The method of claim 1 wherein the block-based storage device is a logical volume provided by a file of a lower-deck filesystem of the data storage system.

10. The method of claim 1 wherein receiving the file-based command directed at the file includes receiving the file-based command from the VMSM in response to the VMSM having received a block-based command directed to a particular block of a block-based storage container from the VM instance, the VM instance having provided the block-based command in response to having received another file-based command from an application running within the VM instance, the other file-based command pointing to a file of a filesystem maintained by the VM instance within the block-based storage container.

11. The method of claim 10 wherein the file-based network storage protocol is Network File System (NFS) over Ethernet.

12. The method of claim 10 wherein the file-based network storage protocol is Common Internet File System (CIFS) over Ethernet.

13. The method of claim 1 wherein metadata of the lightweight filesystem does not persist across restarts of the data storage system.

14. A computer program product comprising a non-transitory computer-readable storage medium storing a set of instructions, which, when performed by a processor of a data storage system, cause the data storage system to provide access to a virtual machine-accessible storage container (VMASC) on the data storage system over a file-based network storage protocol by:
- exporting a mount point for a lightweight filesystem accessible using the file-based network storage protocol to a virtual machine storage manager (VMSM) executing on a remote computing system, the VMSM operating in conjunction with at least one virtual machine (VM) instance, the lightweight filesystem providing a limited set of file-based operation features, the limited set of file-based operation features being smaller than a set of file-based operation features provided by the file-based network storage protocol;
- placing a link to the VMASC as a file entry within the lightweight file system, the VMASC residing on a block-based storage device of the data storage system, the file entry representing the VMASC as a file;
- receiving, at the data storage system, from the VMSM operating on the remote computing system, via the file-based network storage protocol, a file-based command directed at the file represented by the file entry within the lightweight filesystem, the file-based command including a command to access a particular address within the file; and
- in response to receiving the file-based command, accessing a particular block within the VMASC mapped to by the particular address within the file.

15. The computer program product of claim 14 wherein the limited set of file-based operation features includes features for read-only access to filesystem metadata and full read/write access to file contents, the limited set of file-based operation features excluding write access to filesystem metadata.

16. The computer program product of claim 14 wherein placing the link to the VMASC as the file entry within the lightweight file system includes:
- creating, as part of the metadata of the lightweight filesystem, an inode for the file, the inode including a pointer to the VMASC; and
- placing a directory entry within a root directory file, the directory entry pointing to the inode, the root directory file being metadata of the lightweight filesystem.

17. The computer program product of claim 14 wherein the block-based storage device is a logical volume provided by a file of a lower-deck filesystem of the data storage system.

18. The computer program product of claim 14 wherein receiving the file-based command directed at the file includes receiving the file-based command from the VMSM in response to the VMSM having received a block-based command directed to a particular block of a block-based storage container from the VM instance, the VM instance having provided the block-based command in response to having received another file-based command from an application running within the VM instance, the other file-based command pointing to a file of a filesystem maintained by the VM instance within the block-based storage container.

19. An apparatus comprising:
- network interface circuitry for connecting the apparatus to a remote computing system;
- memory configured to store a lightweight filesystem;
- persistent storage configured to provide a set of block-based storage devices; and
- processing circuitry configured to provide access to a virtual machine-accessible storage container (VMASC) on a block-based storage device of the set of block-based storage devices over a file-based network storage protocol via the network interface circuitry by:
  - exporting, via the network interface circuitry, a mount point for the lightweight filesystem accessible using the file-based network storage protocol to a virtual machine storage manager (VMSM) executing on a remote computing system, the VMSM operating in conjunction with at least one virtual machine (VM) instance, the lightweight filesystem providing a limited set of file-based operation features, the limited set of file-based operation features being smaller than a set of file-based operation features provided by the file-based network storage protocol;
  - placing a link to the VMASC as a file entry within the lightweight file system, the file entry representing the VMASC as a file;
  - receiving, from the VMSM operating on the remote computing system, via the file-based network storage protocol over the network interface circuitry, a file-based command directed at the file represented by the file entry within the lightweight filesystem, the file-based command including a command to access a particular address within the file; and
  - in response to receiving the file-based command, accessing a particular block within the VMASC mapped to by the particular address within the file.

20. The apparatus of claim 19 wherein the limited set of file-based operation features includes features for read-only access to filesystem metadata and full read/write access to file contents, the limited set of file-based operation features excluding write access to filesystem metadata.

* * * * *